United States Patent
Dzierzega et al.

(10) Patent No.: US 9,902,065 B2
(45) Date of Patent: Feb. 27, 2018

(54) ALTERING AN INITIALLY PREDETERMINED ROBOT PATH

(71) Applicant: KUKA Roboter GmbH, Augsburg (DE)

(72) Inventors: Christoph Dzierzega, Graben (DE); Markus Dinkhoff, Ochtrup (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 15/051,002

(22) Filed: Feb. 23, 2016

(65) Prior Publication Data

US 2016/0263744 A1    Sep. 15, 2016

(30) Foreign Application Priority Data

Mar. 9, 2015  (DE) .................. 10 2015 002 994

(51) Int. Cl.
  *G06F 19/00*  (2018.01)
  *B25J 9/16*  (2006.01)

(52) U.S. Cl.
  CPC ... *B25J 9/1664* (2013.01); *G05B 2219/40443* (2013.01); *G05B 2219/40496* (2013.01)

(58) Field of Classification Search
  CPC ......... B25J 9/1664; G05B 2219/40443; G05B 2219/40496

(Continued)

(56) References Cited

U.S. PATENT DOCUMENTS 5,548,516 A * 8/1996 Gudat ............... G01S 19/11
                                      701/23
5,949,685 A * 9/1999 Greenwood ........ G05B 19/404
                                      356/634

(Continued)

FOREIGN PATENT DOCUMENTS

CN    100399219 C    7/2008
CN    101898358 A    12/2010

(Continued)

OTHER PUBLICATIONS

German Patent Office; Examination Report in German Patent Application No. 10 2015 002 994.0 dated Aug. 1, 2015; 8 pages.

(Continued)

*Primary Examiner* — Ronnie Mancho
(74) *Attorney, Agent, or Firm* — Wood Herron & Evans LLP

(57) ABSTRACT

A method for altering an initially predetermined path of a robot arrangement having at least one robot includes selecting a portion of the initially predetermined path, altering the selected portion of the path, and predetermining an altered path based on the altered portion of the path. A deviation between the initially predetermined path and the altered path is determined, and a reaction is triggered if the deviation fulfills a predetermined condition for a reaction. In another aspect, a computer programming product, when executed by a computer, causes the computer to select a portion of the initially predetermined path, alter the selected portion of the path, predetermine an altered path based on the altered portion of the path, determine a deviation between the initially predetermined and the altered path, and trigger a reaction if the deviation fulfills a predetermined condition for a reaction.

26 Claims, 2 Drawing Sheets

(58) Field of Classification Search
USPC .................................................. 700/245, 250
See application file for complete search history.

(56) References Cited

U.S. PATENT DOCUMENTS

| | | | | |
|---|---|---|---|---|
| 8,332,067 | B2* | 12/2012 | Ditscher | B25J 9/1671 |
| | | | | 700/245 |
| 8,774,965 | B2 | 7/2014 | Weiss et al. | |
| 8,957,909 | B2* | 2/2015 | Joseph | G06F 3/0346 |
| | | | | 345/156 |
| 9,352,561 | B2* | 5/2016 | Harjee | B41J 2/07 |
| 2007/0146325 | A1* | 6/2007 | Poston | G06F 3/0317 |
| | | | | 345/163 |
| 2009/0043504 | A1* | 2/2009 | Bandyopadhyay | G01C 17/38 |
| | | | | 701/469 |
| 2014/0297031 | A1* | 10/2014 | Iwasaki | B25J 9/1664 |
| | | | | 700/245 |
| 2014/0298266 | A1* | 10/2014 | Lapp | G06F 3/04883 |
| | | | | 715/835 |
| 2014/0371905 | A1* | 12/2014 | Eberst | B25J 9/1664 |
| | | | | 700/253 |
| 2015/0022447 | A1* | 1/2015 | Hare | G06F 3/0304 |
| | | | | 345/158 |
| 2015/0141773 | A1* | 5/2015 | Einav | A61B 5/0484 |
| | | | | 600/301 |

FOREIGN PATENT DOCUMENTS

| | | |
|---|---|---|
| DE | 10305384 A1 | 8/2004 |
| DE | 10 2005 060 967 A1 | 6/2007 |
| DE | 102006022483 A1 | 11/2007 |
| DE | 60225137 T2 | 2/2009 |
| DE | 102012015437 A1 | 5/2014 |
| EP | 0145967 A2 | 6/1985 |
| EP | 1531028 A2 | 5/2005 |
| EP | 1862876 A1 | 12/2007 |
| EP | 2255931 A2 | 12/2010 |
| WO | 2014019706 A1 | 2/2014 |

OTHER PUBLICATIONS

European Patent Office; Search Report in European Patent Application No. 15 003 448.6 dated Mar. 8, 2016 (8 pages).
European Patent Office; Examination Report in European Patent Application No. 15 003 448.6 dated Nov. 6, 2017, 5 pages.
Chinese Patent Office; Officer Action in related Chinese Patent Application No. 201610126327.2 dated Nov. 3, 2017; 5 pages.

* cited by examiner

ALTERING AN INITIALLY PREDETERMINED ROBOT PATH

CROSS-REFERENCE TO RELATED APPLICATIONS

This application claims the benefit of priority under 35 U.S.C. § 119(a) to German Patent Application DE 10 2015 002 994.0, filed Mar. 9, 2015 (pending), the disclosure of which is hereby incorporated by reference in its entirety.

TECHNICAL FIELD

The present invention relates to a method for altering an initially predetermined path of a robot arrangement with at least one robot as well as a system and a computer program product for implementing the method.

BACKGROUND

A method is known from DE 10 2006 022 483 A1 for displaying a local section of a robot path predetermined via a spline method, in which a support point of the robot path to be changed, the predetermined path passing through it, and at least one direction through the support point, perpendicular to the progression of the path, can be defined. In one embodiment maximum correction limits can be shown, within which a correction of the location of the support point can be implemented.

In particular, such a change of a support point of a robot path initially predetermined by splines can lead to changes of the remaining robot path, which are unexpected for the user and/or hard to predict, particularly intuitively, and which are not desired, under certain circumstances.

As an example to this regard, FIG. 1 shows a robot path $x(s)$, initially predetermined by splines, through predetermined support points P1 to P5. When the user changes, for example according to the method known from DE 10 2006 022 483 A1, the support point P3 in the manner indicated by the displacement arrow $\Delta P3:P3 \rightarrow P3'$, this and/or a predetermination of the robot path leads via splines through the support points P1, P2, P3', P4, and P5 to an altered robot path $x'(s)$, indicated in FIG. 1 in dot-dash lines, which in part significantly differs from the (original) initially predetermined robot path $x(s)$.

The object of the present invention is to improve an alteration of an initially predetermined path of a robot arrangement comprising at least one robot.

SUMMARY

According to one aspect of the present invention the method for altering an initially predetermined path of a robot arrangement comprising at least one robot shows the following, at least partially automated steps:
(a) Selecting a portion of the initially predetermined path;
(b) Altering the selected portion;
(c) Predetermining an altered path based on the altered portion;
(d) Determining a deviation between the initially predetermined and the altered path; and
(e) Triggering a reaction, if the deviation fulfills a predetermined condition for a reaction.

Here, the steps (d) and/or (e) are performed and/or implemented in an embodiment as a function of one, particularly the same, predetermined condition for selection.

According to one aspect of the present invention a system is provided for a particularly at least partially automated alteration of an initially predetermined path of a robot arrangement comprising at least one robot, particularly by hardware and/or software technology, for implementing a method described here and/or showing:
Means for selecting a portion of the initially predetermined path;
Means for altering the predetermined portion;
Means for predetermining an altered path based on the altered portion;
Means for determining a deviation between the initially predetermined and the altered path, particularly as a function of a predetermined condition for selections; and
Means for triggering a reaction if the condition fulfills a predetermined condition for reaction, particularly as a function of one, particularly a certain predetermined condition for selection.

One, particularly the only one, or several robots of the robot arrangement show in one embodiment each at least six, particularly at least seven joints, particularly rotary joints, that can be actuated, and are particularly actuated. The robot arrangement comprises in one embodiment a control for actuating the robot and/or robots, particularly their joint drives, for traveling the path. The system may also be implemented in the control and/or exchange data with it and/or be equipped to do so.

In one embodiment, the path of the robot arrangement and/or the robot path defines, particularly describes, a sequence of positions and/or orientation, particularly three-dimensional ones, with one or more fixed references to the robot, particularly so-called TCPs of one or more robots of the robot arrangement.

By the particularly optional determination, particularly dependent on selections, of a deviation between the initially predetermined and altered path and the triggering of a reaction based and/or dependent on the deviation during the implementation a user can better estimate any alteration of the (remaining) path due to an alteration of a portion of the path he/she predetermined and perhaps discard it in a further development, particularly if said alteration is not desired.

In one embodiment the originally or initially predetermined and perhaps to be altered path and/or the altered path is predetermined and/or defined entirely or sectionally, particularly at least in the proximity of the portion to be altered, using one or more splines, particularly cubic or B-splines and/or sectionally defined polynomials of third or higher order, particularly programmed and/or saved, particularly by predetermined, particularly saved support points of the splines. In one embodiment, two respectively successive splines of the path pass through the same support point and show there the same first and second derivation and/or (path) tangent and the same curvature.

If the path defines a sequence of three-dimensional positions or orientations of one or n robot-fixed references, the splines are particularly three and/or (n×3)-dimensional, the path defines a sequence of three-dimensional positions and orientations of one or n robot-fixed references, the splines are particularly six and/or (n×6)-dimensional. In one embodiment, the support points may be predetermined in the Cartesian space or in the space of the joint coordinates and perhaps be transferred by reverse/forward transformation into the joint and/or operating space.

In one embodiment the portion selected and/or to be altered comprises a support point of the path, particularly predetermined and saved, particularly a predetermined and saved support point of at least one spline defining the path; in particular the portion selected and/or to be altered may represent particularly a support point of the path, predetermined and potentially saved of at least one spline defining the path.

In one embodiment the portion is altered via a particularly manual selection of a particularly saved command of a program, by which the path is predetermined. Additionally or alternatively the portion may also be selected by a particularly manually controlled approach of a respective pose of the robot arrangement, with in a further development of such an approached pose the most closely located portion of the initially predetermined path being selected as the portion.

In one embodiment the selected portion is altered, particularly displaced, by predetermining, particularly via a particularly manually controlled approach of a new portion, with, in a further development, the approached pose and/or a respective position and/or orientation of the robot-fixed reference(s), particularly due to a respective operating input by the user, being predetermined as the new and/or altered portion, particularly saved, particularly initially saved temporarily.

In one embodiment the predetermination of the altered path occurs based on the altered portion in an entirely or partially automated fashion. In a further development the altered path, similar to the initially predetermined path, is predetermined, at least in the proximity of the selected and/or altered portion, particularly by support points, particularly splines of identical types, with at least one spline of the initially predetermined path comprising the selected portion of the initially predetermined path and the altered path being predetermined such that at least one spline of the altered path includes the altered portion, with, in one further development, at least one, preferably all additional support points of the splines of the initially predetermined path, particularly all other support points of the entire initially predetermined path remaining unchanged and/or coinciding with the other support points of the altered path.

In one embodiment the conditions for selection include a user selection, particularly user input, as a function of which the deviation is determined and/or the reaction is triggered. In other words, in one embodiment the determination of the deviation and the triggering of the reaction occurs optionally depending on whether a user does or does not want it. In another embodiment the determination of the deviation and the triggering of the reaction may also occur mandatorily and/or independent from the user.

Additionally or alternatively, in one embodiment the conditions for selection include a feature of the selected portion, based on which the determination is determined and/or the reaction is triggered. In a further development, the deviation can be reviewed and perhaps a reaction triggered only in certain portions of the initially predetermined path. In one embodiment the deviation is not determined and/or the reaction is not triggered if the selected portion includes, particularly represents a first or last support point of the initially predetermined path.

In one embodiment the deviation includes a maximum distance between an initially predetermined path and the altered one, which may particularly represent the maximum, particularly Euclidean distance between the initially predetermined and the altered path. Additionally or alternatively the deviation includes in one embodiment a distance between a single part or multi-part predetermined portion of the initially predetermined path and a predetermined, particularly corresponding portion of the altered path, in particular the maximum, particularly Euclidean distance between a predetermined portion of the initially predetermined path and a predetermined, particularly corresponding portion of the altered path. The predetermined portion may be shorter than the (initially predetermined and/or altered) path and for example comprise only one or more splines. Similarly, this predetermined portion may also include and/or represent the entire (initially predetermined and/or altered) path. In other words, the particularly Euclidean distance between the initially predetermined and the altered path may be reviewed in one or more selected portions or over the entire path and/or its maximum value.

The distance between one point of the initially predetermined path and a corresponding point of the altered path represents in one embodiment a scalar parameter, particularly a standard, particularly a numerical or maximum standard of a connection vector from the point of the initially predetermined path to an intersection of a normal level through said point, which in this point is perpendicular in reference to a tangent of the path, of the altered path.

In one embodiment the condition for the reaction is fulfilled, particularly precisely fulfilled, when and/or if the deviation exceeds a predetermined threshold.

Accordingly, in one embodiment the condition for a reaction is fulfilled, particularly precisely fulfilled if and/or when the altered path at least at some point is outside a predetermined tolerance range about the initially predetermined path, wherein its particularly constant radius then may be equivalent to the predetermined threshold.

In one embodiment the reaction includes the particularly optical and/or visual, acoustic, and/or haptic issuance of a notice, particularly on a monitor and/or by way of activating illuminating means. This way the user can be informed of the fact that the alteration performed and/or desired of the portion of the initially predetermined path leads to an alteration and/or deviation which fulfills the predetermined condition for reaction, particularly that a distance between the initially predetermined and respectively altered path exceeds a predetermined threshold. In one embodiment the deviation is issued, particularly the difference of the maximum distance from the predetermined threshold.

Additionally or alternatively the reaction may include an inquiry of a permission of the alteration, with the altered portion and/or the altered path being discarded if the alteration is denied by the user and/or is not permitted in spite of the inquiry.

Accordingly, in one embodiment the altered portion and/or the altered path, thus particularly a support point of at least one spline altered by the user, may be initially predetermined by a path, initially only temporarily, particularly saved and particularly only be accepted and/or used instead of the portion of the initially predetermined path as the portion of the predetermined path and/or the point of the initially predetermined path as the newly predetermined path, particularly lastingly and/or finally and/or in a saved program if the conditions for a reaction are not fulfilled or, in case of fulfilled conditions for a reaction, the alteration is approved and/or not denied by the user.

A means in the sense of the present invention may be embodied by way of technical hardware and/or software means, particularly a processing, particularly micro-processing unit (CPU), preferably connected via a storage and/or bus system transmitting data and/or signals, particularly digital ones, and/or show one or more programs or program modules. The CPU may be embodied such that commands are implemented to process a program saved in a storage system, record input signals from a data bus and/or issue output signals to a data bus. A storage system may comprise one or more, particularly different storage media, particularly optical, magnetic, solid matter, and/or other non-volatile media. The program may be embodied such that it represents and/or can implement the method described here such that the CPU can execute the steps of such methods and thus can particularly alter the initially predetermined path.

BRIEF DESCRIPTION OF THE DRAWINGS

Additional advantages and features are found in the dependent claims and the exemplary embodiments, wherein, in partially schematic views:

DETAILED DESCRIPTION

Figure 2:
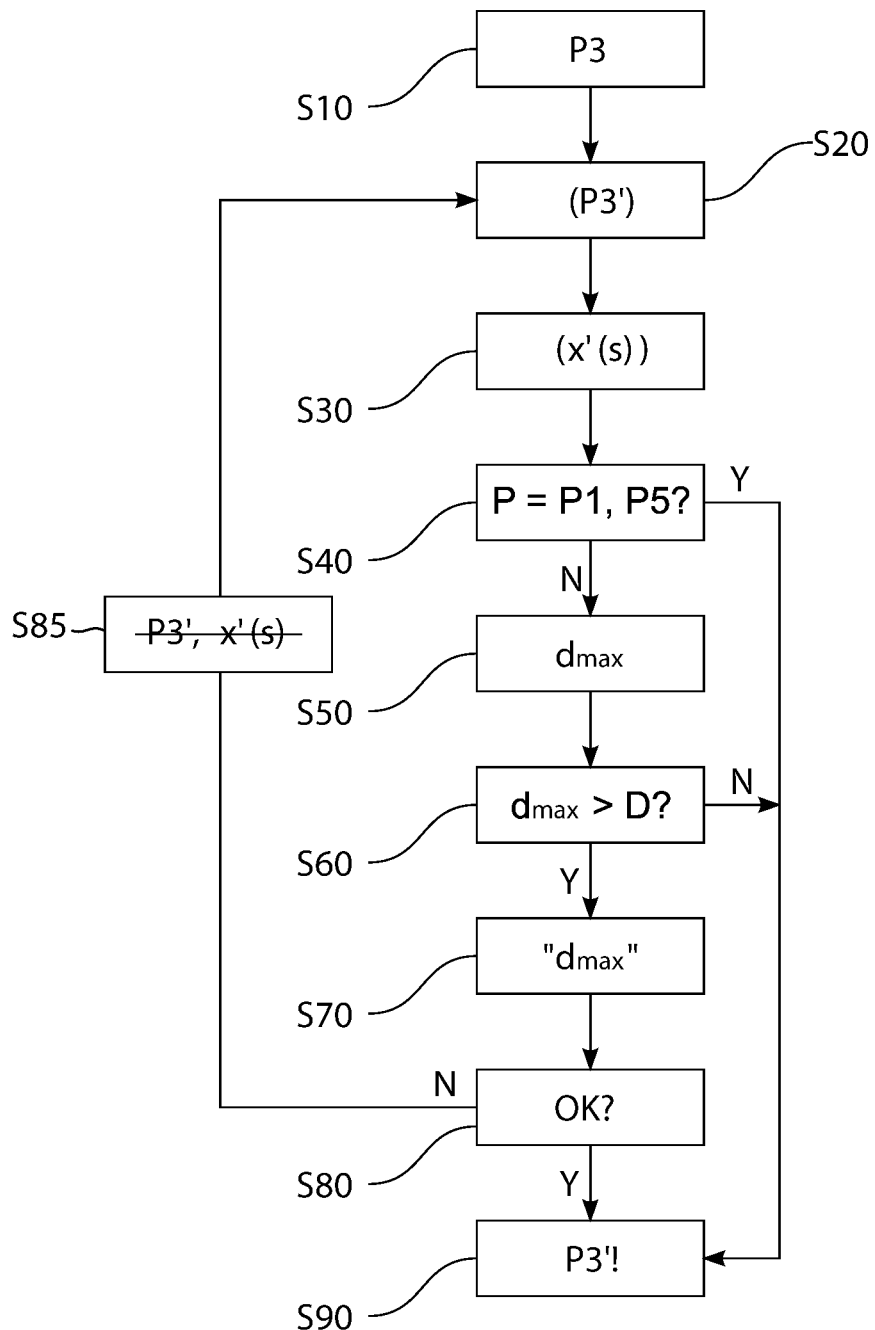
FIG. 2: shows a method according to one embodiment of the present invention.

FIG. 2 shows a method according to an embodiment of the present invention, which is performed by a system in the form of a control 2 of a robot 1.

Figure 1:
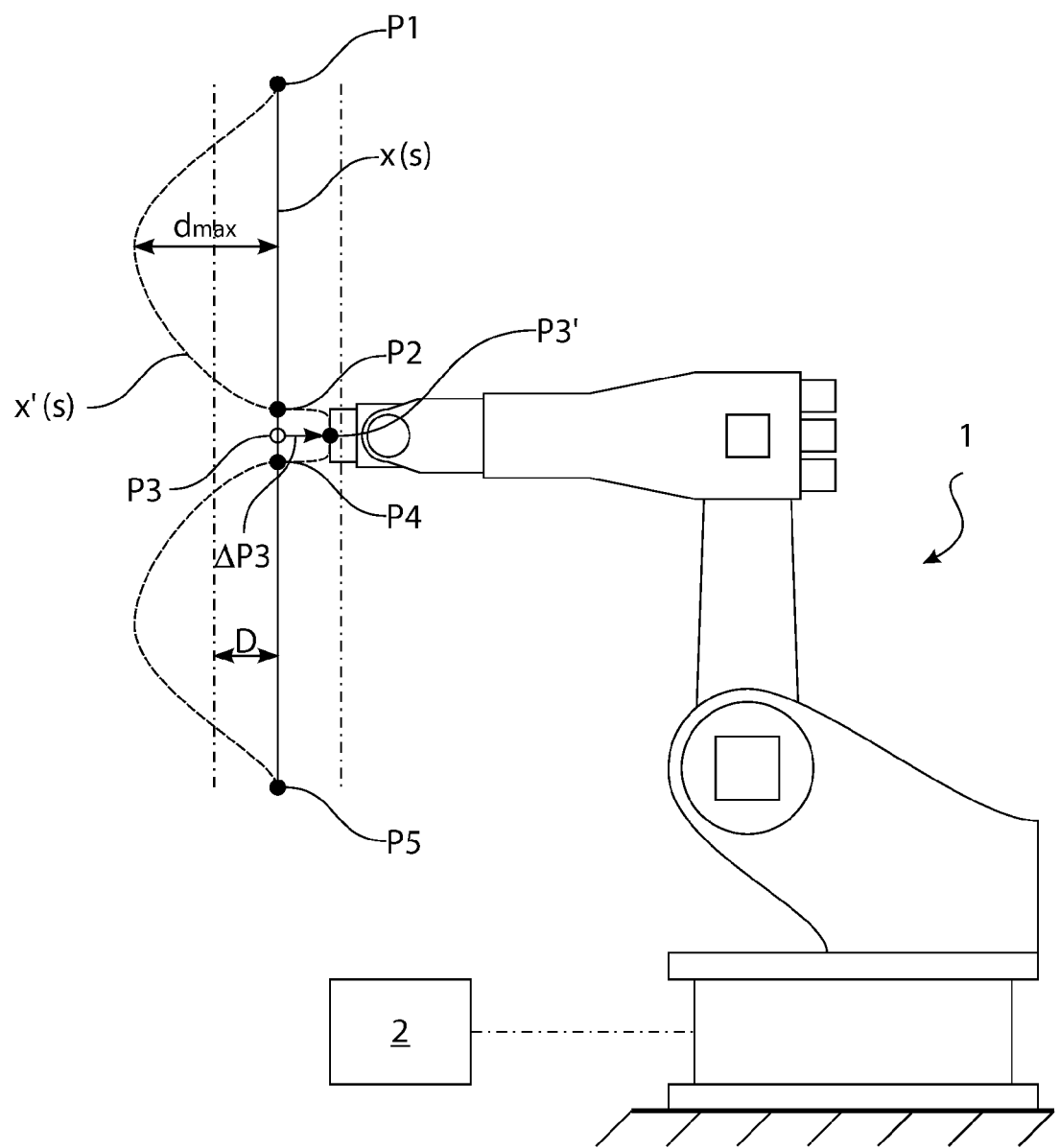
FIG. 1: shows an altering of a path of a robot arrangement according to one embodiment of the present invention.

In a first step S10 a predetermined support point P3 is selected via an initially predetermined path x(s) of a TCP of a robot, predetermined via splines through predetermined support points P1 to P5, which in FIG. 1 are shown in continuous lines, for example by selecting a respective command of a program, defining this support point P3, by which the path is initially predetermined.

In a second step S20 the selected support point P3 is initially temporarily ("(P3)") altered and/or predetermined as a new altered support point P3' via a manually controlled approach of a new position and/or orientation of the TCP and the respective confirmation input ("touch up") by the user, as indicated in FIG. 1 by a displacement arrow ΔP3:P3→P3'.

Then the control issues in a step S30, initially temporarily ("x'(s)"), an altered path x'(s) based on the altered support point P3' via splines through the support points P1, P2, P3', P4, and P5, which are shown FIG. 1 in dot-dash lines.

In a step S40 the control checks if the conditions for selection are fulfilled.

They include a user selection in the exemplary embodiment. The control executes the following steps S50 to S80, when a user has selected them, otherwise (S40: "Y") directly jumps to the step S90, in which the initially only temporarily saved altered support point P3' and thus also the altered path x'(s) is accepted instead of the initially predetermined support point P3 and/or the initially predetermined path x(s), is particularly saved ("P3!").

Additionally, the conditions for selection include a feature of the selected support point. The control executes the following steps S50 to S80 only if the selected support point does not represent the first support point P1 or the last support point P5 of the initially predetermined path x(s), otherwise (S40: "Y") respectively jumps directly to the step S90.

If the user has selected a review of the deviation and the selected support point is different from the first or the last support point (S40: "N"), the control determines in a step S50 a deviation in the form of a maximum distance $d_{max}$ between the initially predetermined path x(s) and the altered path x'(s). In a deviation, not shown, the deviation may also include distances between selected corresponding portions of the paths, particularly points of the paths.

The distance between one point of the initially predetermined path and a corresponding point of the altered path is here in the exemplary embodiment the amount of a connecting vector from the point of the initially predetermined path to an intersection of a normal level through said point, which is perpendicular at this point to a tangent of the path, with an altered path.

In a step S60 the control checks if the deviation exceeds a predetermined threshold D and thus a predetermined condition for reaction is fulfilled (S60: "Y") or not fulfilled (S60: "N").

Accordingly, in the exemplary embodiment the condition for a reaction is precisely fulfilled if the altered path x'(s) at least at some point exceeds a predetermined tolerance range about the initially predetermined path x(s), with its constant radius being equivalent to the predetermined threshold D (cf. FIG. 1).

If the condition for reaction is fulfilled (S60: "Y") the control triggers the reaction by executing the following steps S70, S80. Otherwise (S60: "N") the control abstains from triggering the reaction, but jumps directly to the step S90.

In step S70 the control issues a message which informs the user that the alteration performed and/or desired by him/her ΔP3 leads to an alteration and/or deviation which fulfills the predetermined condition for a reaction, particularly that a distance d between an initially predetermined and respectively altered path exceeds a predetermined threshold D. In the exemplary embodiment the maximal distance $d_{max}$ or the difference is displayed between the predetermined threshold and/or radius of the tolerance range D and the maximum distance $d_{max}$.

Additionally the control inquires in a step S80 about the permission of the change.

If the user denies and/or fails to approve it in spite of the inquiry (S80: "N"), the altered support point P3' and thus the altered path x'(s) are discarded in a step S85 ("P3', x'(s)"). The control then returns to the step S20, in which the user can change the selected support point in a different fashion.

Otherwise (S80: "Y") in a step S90 the initially only temporarily saved, altered support point P3' and thus also the altered path x'(s) are accepted instead of the initially predetermined support point P3 and/or the initially predetermined path x(s), particularly saved ("P3'!").

Although exemplary embodiments have been explained in the above description, it is hereby noted that a plurality of modifications is possible. In addition, it is hereby noted that the exemplary embodiments are merely examples which are not intended to in any way restrict the scope of protection, the uses, and the construction. Rather, the preceding description gives a person skilled in the art a guideline for the implementation of at least one exemplary embodiment, wherein various modifications, in particular with respect to the function and arrangement of the components described, can be undertaken without departing from the scope of protection as indicated by the claims and the equivalent combinations of features.

LIST OF REFERENCE NUMBERS

1 Robot
2 Control (System)
P1, . . . P5 Support points
x(s) initially predetermined spline-path
x'(s) altered spline-path
$d_{max}$ Distance (Deviation)
D Threshold

What is claimed is:

1. A method for altering an initially predetermined path of a robot arrangement including at least one robot and a controller in communication with the at least one robot, the method comprising:
    selecting by the controller a portion of the initially predetermined path;
    modifying by the controller the selected portion of the path;
    predetermining an altered path based on the modified portion of the path;
    determining a deviation between the initially predetermined path and the altered path; and
    triggering a reaction if the deviation fulfills a predetermined condition.

2. The method of claim 1, wherein the controller selects a portion of the initially predetermined path by user directed input to the controller.

3. The method of claim 1, wherein determining the deviation comprises determining the deviation based on a predetermined condition for selection.

4. The method of claim 1, wherein triggering the reaction comprises triggering the reaction based on a predetermined condition for selection.

5. The method of claim 1, wherein the path is predetermined at least sectionally using at least one spline.

6. The method of claim 5, wherein the path is predetermined in the selected portion using at least one spline.

7. The method of claim 1, wherein the selected portion comprises a support point of the path.

8. The method of claim 7, wherein the selected portion is the support point.

9. The method of claim 1, wherein selecting the portion of the path comprises choosing a command of a program, by which the path is initially predetermined.

10. The method of claim 1, wherein the selected portion is modified by specifying a new portion of the path.

11. The method of claim 10, wherein the selected portion is modified by approaching the new portion.

12. The method of claim 1, wherein the predetermined condition for selection includes at least one of a user selection or a feature of the selected portion of the path.

13. The method of claim 1, wherein the deviation includes at least one of:
    a maximum distance between the initially predetermined path and the altered path; or
    a distance between a selected portion of the initially predetermined path and the altered path.

14. The method of claim 13, wherein the deviation is the maximum distance between the selected portion of the initially predetermined path and the altered path, or the distance between the selected portion of the initially predetermined path and the altered path.

15. The method of claim 1, wherein the condition for reaction is fulfilled if the deviation exceeds a predetermined threshold.

16. The method of claim 1, wherein the reaction comprises issuing a message.

17. The method of claim 16, wherein the message is related to the deviation.

18. The method of claim 1, wherein the reaction includes requesting permission for implementing the modification, the method further comprising discarding at least one of the modified portion or the altered path in response to the permission being denied by the user.

19. The method of claim 1, wherein the path defines a sequence of positions and/or orientations of at least one reference fixed to the robot.

20. The method of claim 19, wherein the positions and/or orientations are three-dimensional.

21. A system for altering an initially predetermined path of a robot arrangement including at least one robot, the system comprising:
    means for selecting a portion of the initially predetermined path;
    means for modifying the selected portion of the path;
    means for predetermining an altered path based on the modified portion;
    means for determining a deviation between the initially predetermined path and the altered path; and
    means for triggering a reaction if the deviation fulfills a predetermined condition.

22. The system of claim 21, wherein determining the deviation comprises determining the deviation based on a predetermined condition for selection.

23. The system of claim 21, wherein the triggering the reaction comprises triggering the reaction based on a predetermined condition for selection.

24. A computer programming product having program code stored in a non-transitory computer-readable storage medium, the programming code, when executed by a computer, causes the computer to:
    select a portion of an initially predetermined path;
    modify the selected portion of the path;
    predetermine an altered path based on the modified portion of the path;
    determine a deviation between the initially predetermined path and the altered path; and
    trigger a reaction if the deviation fulfills a predetermined condition.

25. The computer programming product of claim 24, wherein the computer determines the deviation based on a predetermined condition for selection.

26. The computer programming product of claim 24, wherein the computer triggers the reaction based on a predetermined condition for selection.

* * * * *